United States Patent [19]
Toshioka et al.

[11] 3,848,368
[45] Nov. 19, 1974

[54] APPARATUS FOR PNEUMATIC TIRE UNIFORMITY CORRECTION

[76] Inventors: Tokuma Toshioka, No. 4-5-65 Higashi-Kaigankita, Chigasak-shi, Kanagawa-ken; Haruyuki Takagi, No. 3-4-40 Higashi-Kaigan, Tsujido, Fuijisawa-shi, Kanagawa-ken; Masayuki Shirai, No. 4-50 Tatsukamigaoka, Hiratsuka-shi, Kanagawa-ken, all of Japan

[22] Filed: July 5, 1972

[21] Appl. No.: 269,245

[30] Foreign Application Priority Data
July 6, 1971  Japan.............................. 46-49256

[52] U.S. Cl. ............................ 51/165 R, 51/106 R
[51] Int. Cl. ......................................... B24b 49/16
[58] Field of Search ...................... 51/106 R, 165 R

[56] References Cited
UNITED STATES PATENTS

| | | | |
|---|---|---|---|
| 3,491,493 | 1/1970 | Deist | 51/106 R X |
| 3,553,903 | 1/1971 | Christie | 51/165 R |
| 3,574,973 | 9/1971 | Rader | 51/165 R |
| 3,724,137 | 4/1973 | Hofelt | 51/106 R |

Primary Examiner—Harold D. Whitehead
Attorney, Agent, or Firm—Robert E. Burns; Emmanuel J. Lobato; Bruce L. Adams

[57] ABSTRACT

Apparatus and method for improving the radial force uniformity of a pneumatic tire rotated under a loaded condition. The rotating loaded tire is sensed with load cells that develop signals corresponding to radial force variations and developed in correspondence with the areas of the periphery of the tire treads that develop the signals. A reference signal level is established and all radial force variation signals over this level are applied through logic circuitry to memory devices, in the form of flip-flops. Grinding means that grind off or remove the corresponding irregularities on areas that develop the radial force variations above the given level are rendered effective by the logic circuitry to grind these areas when they present themselves, subsequent to being sensed or graded, to the grinders. The memory devices are allocated to respective areas on the circumference of the tire treads so that the variation signals developed by the individual areas are memorized by corresponding memory elements which in conjunction with the logic circuitry make certain that the grinders are activated and grind their corresponding areas only and to the extent necessary to make the area conform to the selected radial force level.

6 Claims, 5 Drawing Figures

APPARATUS FOR PNEUMATIC TIRE UNIFORMITY CORRECTION

BACKGROUND OF THE INVENTION

This invention relates generally to pneumatic tire dynamic behavior and more particularly to a method and apparatus for improving the radial force uniformity of pneumatic tires.

It is well known that irregularities in pneumatic tires appearing from the manufacturing thereof result in nonuniform dynamic behavior of the tires. If these irregularities are small, they have little effect; however, if they exceed certain limits, they produce a rough ride and cause handling difficulties in service. The kind of ride the tires provide depends to a great extent on the peak-to-peak variations in radial and lateral forces. The radial variation is particularly important since these produce vertical displacements of the tire and wheel on which it is mounted. Thus tire manufacturers "grade" the tires and correct the tires for radial force variations by removing the peaks of the irregularities to improve the radial force uniformity and thereby improve the dynamic behavior of the tires. The tire corrections are made under simulated "on the road" conditions of operation.

Methods and apparatus to improve the dynamic behavior of pneumatic tires by abrasively removing a portion of the outer surface of the tires are well known. One such method and apparatus are disclosed in U.S. Pat. No. 3,491,493 in which a tire rotating under load exerts a varying force radially on an axle supporting the tire and the variations in magnitude of the force, depending upon the physical irregularities of the tire, are determined. The tire is mounted eccentrically so that maximum eccentricity coincides with the point of maximum radial force and the tire then is rotated against an abrader which removes material from the tire to compensate for the irregularities.

In this patented technique the tire is first run through a "production uniformity grading machine" to develop a radial force curve. The point at which the highest force measurement is recorded is marked on the tire and the tire is then mounted on a tire uniformity optomizing machine with the tire mounted so that its maximum force point lies within the maximum eccentricity point and grinding wheels or other abrasion means are positioned so that they abrade the tire at the points of maximum force and eccentricity. Since in this apparatus the maximum radial force is read out in pounds, there must be a conversion made to the depth adjustment in inches by which the maximum radial force is removed and this is accomplished by a formula having a constant in units of inches per pound determined empirically for each type of tire. This type of method and apparatus requires two machines and there is no assurance that the grinding will occur at the proper points to remove radial force variations.

Another apparatus for pneumatic tire uniformity correction is disclosed in U.S. Pat. No. 3,574,973 in which a closed loop servosystem controls grinder heads for grinding a tire which runs against a road wheel having load self-detectors to determine radial force variations in the tire under loaded conditions. The force channel obtaining the signals from the load cells provides correction signals to the grinder servosystem, which are updated each tire revolution, for actuating the grinders to remove small segments from the surface of the tire to cancel out at least a predetermined minimum of the radial force variations. In this patented device a single machine is required and the peaks are determined by it and a conventional register then activates control of the grinders on a delay basis in order to grind in approximately the area or points at which the maximum peak variations were sensed. The apparatus only approximates the areas on which grinding is to be accomplished to render the pneumatic tire uniform.

SUMMARY OF THE INVENTION

It is a principal object of the present invention to provide an apparatus for optomizing the uniformity of a pneumatic tire accurately.

Another object of the present invention is to provide an apparatus that positively locates the areas in which peak radial force variations occur and then automatically accurately commonds grinders to grind the areas of these peak variations as they present themselves to the grinders.

According to the invention, a plurality of memory means, for example, flip-flops, are allocared to respective subdivisions or areas on the circumference of a pneumatic tire. These memory devices are representative of the areas on the tire to which they are allocated. The tire is rotated under a loaded condition and sensed as to the existence of radial force variations above a given level determined by a reference signal. When signals representative of radial force variations above this level occur, a second signal generator generates signals in response to the sensing and applies them to logic circuitry, and more particularly AND gates which are opened at periods corresponding to the individual peripheral areas of the tire having major peaks in the irregularities thereon. Counting or synchronizing pulses control the allocation of the peaks to their respective memory means during a revolution of the tire.

The outputs of the memory devices in conjunction with counters establish the areas to be corrected and other AND gates in conjunction with a grind signal generator commands relay controls for grinding motors of grinders rendered effective at the periods corresponding to the areas to be corrected subsequent to the termination of the reference signal which corresponds to the termination of a revolution of the tire.

A feature of the present invention is the accuracy with which the activation of the grinders and the areas of the tires to be abraded are correlated. Thus a drive motor for a grinder will not be activated when a particular area presents itself unless its corresponding memory device, its corresponding flip-flop, has memorized therein a condition of radial force variation in excess of the reference level.

BRIEF DESCRIPTION OF THE DRAWINGS

Other objects, advantages and features of the method and apparatus according to the invention will appear from the following description of an example of the invention, and the novel features will be particularly pointed out in the appended claims and drawings, in which:

DESCRIPTION OF THE PREFERRED EMBODIMENT

Figure 1:
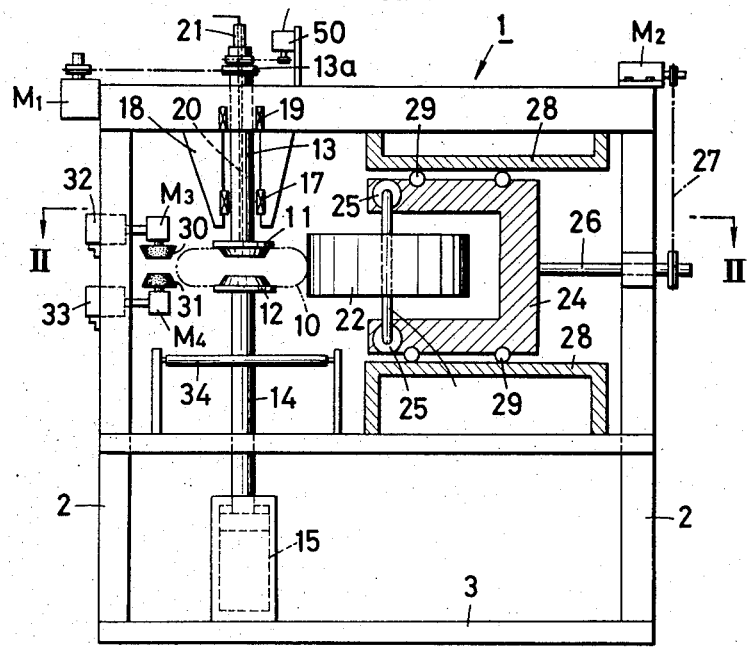
FIG. 1 is a front elevation view, partly in section, of an apparatus according to the invention.

A tire correction apparatus 1 according to the invention has a framework 2 with a base 3. In order to determine the radial force variations in a tire under loaded rotation conditions a tire 10 is held between two tire rims 11, 12 mounted on the ends of rotatably mounted shafts 13, 14. A lower shaft 14 is movable reciprocably in an axial direction as a piston of a hydraulic cylinder 15, mounted on the base 3, so that the tire 10 is clamped and held between the two rims 11, 12. The upper shaft 13 is journaled in a support 18 having two axially spaced thrust bearings 19 so that it is firmly held when the tire is loaded during rotation as later described. The upper shaft 13 is provided with an axial passageway 20 connected through a rotary joint 21 to a source of air under pressure, not shown, for inflating the pneumatic tire 10 and is rotatably driven by a motor M1 through a belt and pulley connection 13a or drive as illustrated.

Provision is made in the apparatus and method of the invention for loading the pneumatic tire 10 during rotation thereof in order to ascertain its radial force uniformtiy characteristic, i.e., to grade it. Accordingly, a loading drum 22 is rotatably mounted on a shaft 23 carried on a carriage 24. The pivot shaft for the load drum is provided with load cells 25 which function as transducers to develop signals corresponding to and indicating the radial force variations of the tire as hereinafter explained.

The carriage 24 is connected to a rotary driven shaft 26 that is coupled to the carriage in a manner so that it can rotate thereon and advance the loading drum 22 toward the tire or retract it away from the pneumatic tire under control of a drive motor M2 connected to the drive shaft 26 through a drive belt 27 as illustrated. The carriage is mounted between rails 28 along which rollers 29 connected to the carriage bear and movably mount the carriage. Rotation of the carriage drive motor in one direction will advance the loading drum 22 into engagement with the threads of the tire 10 with a desired load applied and rotation in an opposite direction will retract the carriage so that the loading drum 22 is moved free of or spaced from the tire.

In order to effect radial force uniformity correction of the tire as required, as hereinafter explained, a pair of rotary driven tapered grinders 30,31 is provided and are rotatably driven by motors M3,M4 activated by electromagnetic means 32,33 which when energized will advance the grinders into engagement with the tire and the grinders then execute a grinding operation thereon as later described. The two grinders engage the periphery of the tire substantially along the shoulder portions of the treads and each grinds up to the center of the treads.

The tires to be corrected as to their dynamic behavior are mounted horizontally in the apparatus and are transported thereto by a conveyor 34 along which the tires are spaced. The conveyor is a roller type conveyor in which the rolls are rotatably driven. A section 34a of the conveyor has an opening therein, not shown, to allow the piston 14 to move upwardly and pick up the tire to be corrected from the conveyor and transport it vertically to the position illustrated in FIG. 1 where it is "graded" and then "corrected" by abrading it as necessary as later explained.

Figure 2:
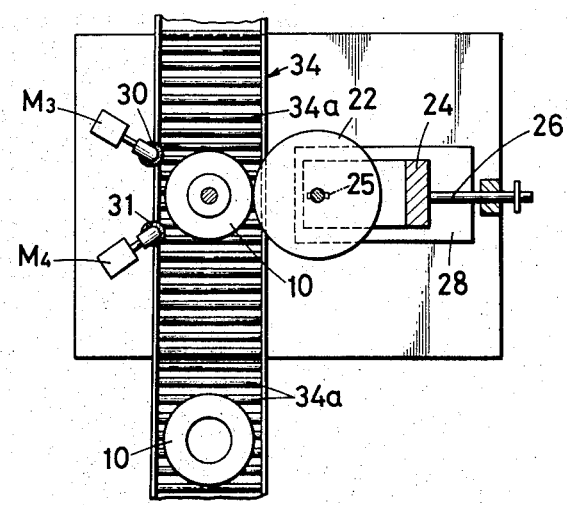
FIG. 2 is a section view taken along section line 2—2 of FIG. 1.
Figure 3:
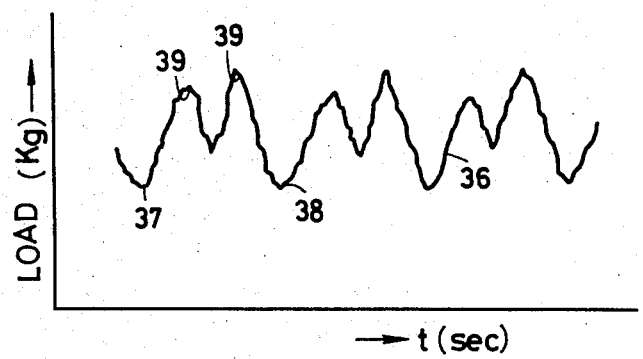
FIG. 3 is a graph of the radial force variations detected on a pneumatic tire in the apparatus of FIG. 1.

In order to correct the irregularties causing radial force variations, these must first be determined. The variations are determined by the varying output of the load cells, for example, as illustrated in FIG. 3. Therein a curve 36 illustrating the radial force deviations is graphed. In order to take the radial force deviation readings or grade the tires 10, they are transported on the conveyor spaced at predetermined intervals as seen in FIG. 2 and are successively held in a readiness for grinding position by a suitable centering device, not shown, so that they may be picked up by the hydraulic piston 14 and clamped between the upper and lower rims 11, 12 in a position in which the tire is graded and corrected or abraded.

The rotary joint 21 has valve means therein, not shown, opened to introduce air into the air channel 20 of the upper shaft 13 for inflating the tire. The tire is first inflated when the drive motor M1 is started to rotate the inflated tire and at the same time the loading drum motor M2 is also started so that the loading drum 22 is advanced toward the tire and brought into engagement therewith imparting to the tire a load of a predetermined value simulating "on the road" operating conditions. As a result there is developed a mutually repelling force between the tire and the loading drum and this force is detected by the transducers or load cells 25 as graphed in the radial force curve of FIG. 3 for explaining the invention. The waveform 36 in FIG. 3 has points 37 and 38 which correspond to one full revolution of the tire. The curve would be flat and linear if there were no significant irregularities in the tire, and accordingly there would be a perfectly smooth ride when using the tire on a vehicle. However, irregularities are encountered and the amplitude of the irregularities is determined by the distance on the ordinate between the valley 38 and the peaks 39. The curve graph has the load forces plotted in kilograms on the ordinate and time in seconds as the abscissa.

It will be noticed that the curve 36 does not start at the origin of the graph since a predetermined or base pressure is applied to the tire by the loading drum 22 and the radial force variations exceed that base force. Moreover, the grinding to be effected will be with reference to a grind level illustrated in FIG. 4 so that the peaks, which correspond to irregularties on the tire, will be removed. In other words there is a certain acceptable radial force variation below the grind level, as shown by the broken lines in the graph in FIG. 4.

Figure 4:
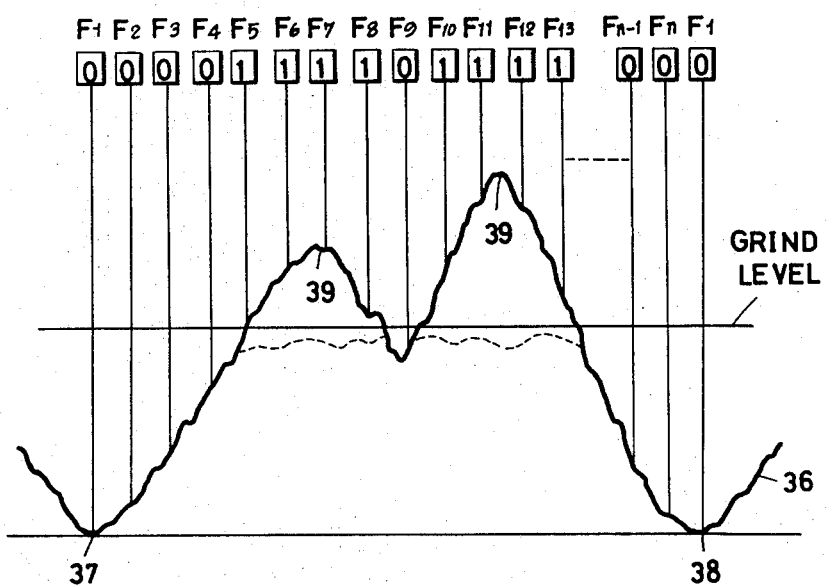
FIG. 4 is an explanatory diagram for explaining the principles of the allocation of finely divided circumferential areas of a tire to specific corresponding memory devices or flip-flops.

The graph in FIG. 4 illustrates the basic principle of the invention. According to the invention the periphery of the tire is subdivided into a plurality of arcs or areas completely around the tire. This subdivision may be as fine as desired. The subdivisions may range from ten to one hundred. In the present invention there are sixty subdivisions. The control circuitry, later described, of the present invention controlling the grinding operation has a plurality of flip-flops, as later explained, each of which is allocated to or corresponds to a respective area or subdivision of the periphery of the tire. Thus the flip-flops in a state of 0 in the graph correspond to those peripheral areas of the tire in which the radial force variations are below the grind level and those in which a grinding operation must be effected are represented by flip-flops in the state 1. In other words in the latter situation the force variations are above the acceptable or grind level and these flip-flops will function as memory devices remembering which areas of the tire are above the grind level and will require grinding. Thus subsequent to grading of the tire, when the radial force "readings" have been taken, command signals to grind will only be executed when the areas of the tire corresponding to the flip-flops in the 1 state are presented to the grinders. Thus a very fine and accurate allocation of areas of the tire periphery is possible and the precise areas that must be ground can be designated during the grading or detection operation. Accordingly, correction of the dynamic behavior of a tire can be precisely accomplished.

Moreover, the grading is completely automatic as well as the control of the grinding operation. The entire overall operation is automatic including the grinding on a tire until its radial force readings are beneath the grind level or at the acceptable level. Thus it can be seen that radial force variation readings may be taken on the tire, then grinding operations effected, subsequent to which again readings can be taken and then grinding operations effected in sequence until the tire is rendered uniform and optomized with respect to dynamic behavior.

CONTROL CIRCUITRY

Figure 5:
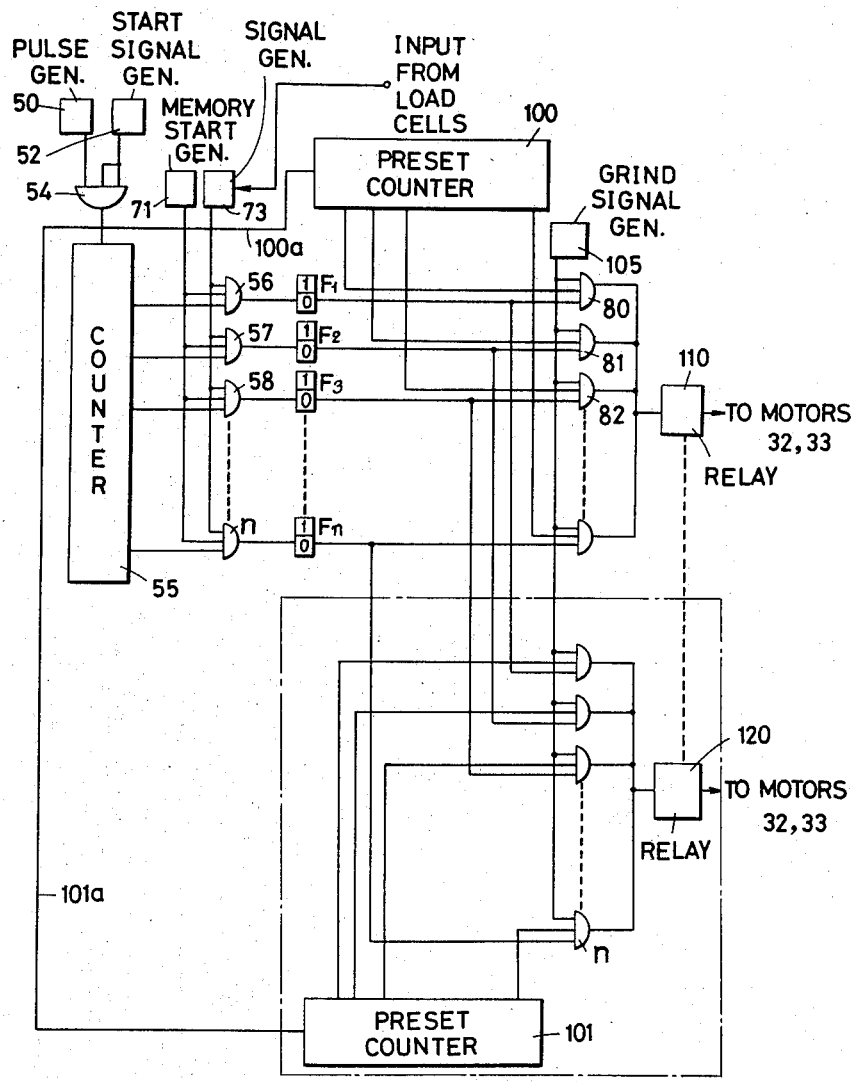
FIG. 5 is a block diagram of electric control circuitry for automatically controlling the apparatus in FIG. 1.

The control circuitry of the invention is shown in FIG. 5 in which a pulse generator 50, coupled to the drive shaft 13 as illustrated in FIG. 1, produces "n" number of pulses in the synchronization of each revolution of the tire. The pulse generator is designed to produce the selected number "n" of pulses per revolution of the driven upper shaft 13 which corresponds to a revolution of the tire 10. These pulses are synchronizing pulses for the control circuit and can be thought of as corresponding to $n$ number of subdivisions of the revolution of the tire. A start signal generator 52 starts the overall operation of the system and operates until the grinding or correction of a given tire has been completed. Thus its start signal corresponds to the point 37 on the graph in FIG. 3. The pulses from both generators are applied to an AND gate 54 connected to a counter 55 which counts the pulses and applies parallel outputs to a plurality of AND gates 56-n. These AND gates receive signals from a memory start signal generator 71 and an over-grind-level signal generator 73 which is a comparator and receives the outputs of the load cells and compares them with a reference signal (i.e., grind level signal) and pulses when the magnitude of the radial force deviations sensed by the load cells exceeds an acceptable level or exceeds the "grind level signal." The memory start signal generator 71 functions to determine the point on the peripheral areas of the tire at which the measuring or detection commences and applies a signal waveform representative of a complete radial force variation occurring at the subdivision of the peripheral areas of the tire during one full cycle of revolution thereof, to be memorized by memory devices F-n. The operation of the "memory start signal generator 71" ceases upon completion of one full revoltuion of the tire. The over-grind-level signal generator 73 receives inputs from the load cells and pulses each time that the transducers or load cells detect that the grind level signal is exceeded. The AND gates 56-n function as switches to apply signals to a plurality of memory devices constituting flip-flops F1–Fn equal to the number of AND gates. It should be noted that the number of AND gates and flip-flops is a number selected to correspond with the desired number of subdivisions or areas on the periphery of the tire and can be any number as before described. However, in the example illustrated in FIG. 4 Fn flip-flops are shown and it is assumed that the present circuitry has a similar number of memory circuits or flip-flops.

It will be remembered that the controlled elements of the control circuitry are the pair of grinding motors which are controlled to effect grinding only on those tire areas, and exactly those areas, that have generated signals corresponding to radial force deviations exceedsing the selected level herein denoted the "grind level". In this example these are illustrated in FIG. 4 as before described. The flip-flops connected to AND gates 56-n receiving signals exceedsing the "grind level" are placed in a state 1 and only these will apply command signals to the grinders. Thus the state of the flip-flops F1–Fn will determine which of two other sets of AND gates 80-n, divided into two groups for application of signals to the set of grinder motors 32,33, will receive inputs.

These two sets of AND gates 80-n receive inputs from respective preset counters 100,101. The two preset counters are connected to receive synchronizing pulses through lines 100a, 101a from the gate 54 that applies the synchronizing pulses. Since there are sixty subdivisions peripherally of the tire, the preset counters are set to count from twenty and from fourth respectively. The one preset counter 100 applies its outputs to the AND gates related to one grinder motor and the other preset counter 101 applies its outputs to the AND gates related to the second grinder motor. Both preset counters apply their outputs differently when they receive the synchronizing pulses. These two sets of AND gates 80-n have inputs from the flip-flops applied thereto that have a state 1 denoting a need for grinding. A third signal is applied to these two sets of AND gates by a grind signal generator 105 that applies its output signal when the reference signal generator 71 terminates its output on completion of one full revolution of the tire.

The preset counters are set to count differently from each other as stated above and accordingly develop outputs which occur at different times from each other. The abrading devices are spaced peripherally of the tire and in this instance are "20 pulses apart" and abrade on opposite shoulders. Since the irregularities causing the radial force variations occur on different peripheral areas of the tire 10, the grinders abrading these areas must be activated at times corresponding to the time at which the individual areas present themselves to the respective grinders. The two preset counters accordingly shift the time of actuation of the grinders because the point of measurement of the radial force deviations is out of registry in time and space to the grinding, i.e., to the grinders. Moreover, since one set of the AND gates 80-n controls one grinder and the other set or group of AND gates controls the other grinder, the preset counters must count differently and apply their outputs to their respective set of the AND gates with the proper time shift as before described.

Thus it can be seen that when the outputs of the grind signal generator 105, the flip-flops in the 1 state, and their respective preset counter coincide, the flip-flops of the two sets of AND gates 80-n will open and discrete signals will be applied to the proper set of grinders properly shifted in time so that the areas of the tire corresponding to given radial force deviations will be abraded and the dynamic behavior of the tire will be optomized.

The outputs of the two sets of AND gates 80-n aply their outputs to respective relays 110,120 that energize the actuators 32,33 that advance their grinders into position and start the motors driving the grinders so that grinding takes place of the areas requiring the abrading for removal of irregularities. The motors are actuated and driven by the command signals from the control circuit and cessation of the command signal causes the grinders to be retracted.

The actuators 32,33 are constructed as a combination electromagnet and plunger device in which the plunger 32a, 33a is actuated by an electromagnet 32b, 33b to bring the grinder into and out of engagement with the periphery of the tire either against or by the tension of a spring, not shown.

From the above description it can be seen that the allocation of respective peripheral surfaces of the tire to individual memory devices in conjunction with the synchronizing pulse signals insures that the grinding operations are effected on the areas of the tire periphery that generate the radial force signals above a given level. Thus the tire can be ground and corrected so that there is radial force uniformity insuring a dynamically well behaved tire and thereby a smooth ride on the tire when in use.

What is claimed is:

1. Apparatus for improving the radial force uniformity of a pneumatic tire comprising, a plurality of memory means each representative of an individual, respective area on the circumference of a pneumatic tire whose radial force uniformity is to be improved, the areas represented by individual memory means being different areas and corresponding jointly to the peripheral area on the treads of the tire, means to sense said tire during rotation thereof in a loaded condition to develop automatically signals representative of radial force variations over a given level, means applying said signals representative of radial force variations over a given level to said memory means for storage therein, abrading means rendered effective automatically under control of said memory means to abrade on the periphery of said tire at periods corresponding to the periods and areas on the circumference of said tire developing the radial force variations above said level present themselves to said abrading means for abrading thereof, and means cooperative with said memory means rendering said abrading means effective only after the termination of the development of the corresponding signals representative of the radial force variations of the tire, said means cooperative with said memory means rendering said abrading means effective including a plurality of logic gates, each of said logic gates corresponding to one of the individual, respective areas on the circumference of the tire, means applying said signals representative of radial force variations stored in said memory means to said logic gates, means for sequentially applying input signals to said logic gates to enable ones of said logic gates receptive of said stored signals representative of radial force variations to develop output signals, and means receptive to said logic gate output signals for rendering said abrading means effective in response thereto.

2. Apparatus for improving the radial force uniformity of a pneumatic tire comprising, means to rotate a tire under a loaded condition simulating the road operation conditions, detection means to detect dynamic radial force variations developed by said tire exceeding a given level and means developing signals representative of said radial force variations exceeding said given level, memory means connected to said detection means corresponding to individual areas circumferentially of said tire memorizing which areas developed said radial force variations exceeding said given level, said areas comprising contiguous, next adjacent areas circumferentially of said tire, and means under control of said memory means including means removing irregularities from the corresponding areas which developed said radial force variations exceeding said given level thereby to render uniform the radial forces developed by said tire when in use, and including a plurality of gates receptive of memory means contents representative of which areas developed said radial force variations exceeding said given level, means for sequentially applying enabling signals to said gates to enable said gates receptive of said memory means contents to develop output signals, and means enabling said means removing irregularities in response to said gate output signals.

3. Apparatus for improving the radial force uniformity of a pneumatic tire according to claim 2, in which said means to sense comprises load cells loaded variably in dependence upon irregularities in said tire developing radial force variations.

4. Apparatus for improving the radial force uniformity of a pneumatic tire according to claim 2, in which said detection means comprises means to apply said signals to said memory means when said radial force variations exceed said given level, and in which said memory means comprises a plurality of flip-flops assuming a selected binary condition when said signals are applied thereto.

5. Apparatus for improving the radial force uniformity of a pneumatic tire according to claim 2, in which said means under control of said memory means comprises control means operated to control said means removing said irregularities.

6. Apparatus for improving the radial force uniformity of a pneumatic tire according to claim 2, in which said means removing said irregularities comprises abrading means.

\* \* \* \* \*